(12) United States Patent
Agombar et al.

(10) Patent No.: US 8,959,300 B2
(45) Date of Patent: Feb. 17, 2015

(54) CASCADE ORDERING

(75) Inventors: John P. Agombar, Winchester (GB); Christopher B. Beeken, Winchester (GB); David J. Carr, Winchster (GB)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 13/102,886

(22) Filed: May 6, 2011

(65) Prior Publication Data

US 2011/0289291 A1   Nov. 24, 2011

(30) Foreign Application Priority Data

May 18, 2010   (EP) .................................... 10163131

(51) Int. Cl.
| | |
|---|---|
| *G06F 12/00* | (2006.01) |
| *G06F 13/00* | (2006.01) |
| *G06F 13/28* | (2006.01) |
| *G06F 11/14* | (2006.01) |
| *G06F 3/06* | (2006.01) |

(52) U.S. Cl.
CPC ........ *G06F 11/1456* (2013.01); *G06F 11/1466* (2013.01); *G06F 3/065* (2013.01); *G06F 11/1458* (2013.01); *G06F 11/1464* (2013.01); *G06F 2201/82* (2013.01); *G06F 2201/84* (2013.01)
USPC ............ 711/162; 711/103; 711/151; 711/170

(58) Field of Classification Search
USPC ......................................................... 711/161
See application file for complete search history.

(56) References Cited

U.S. PATENT DOCUMENTS

| | | | | |
|---|---|---|---|---|
| 4,181,933 | A * | 1/1980 | Benysek ........................ | 711/151 |
| 4,974,156 | A * | 11/1990 | Harding et al. ................ | 711/162 |
| 5,504,882 | A * | 4/1996 | Chai et al. ...................... | 714/5.1 |
| 7,360,048 | B2 * | 4/2008 | Agombar et al. ............. | 711/162 |
| 7,386,695 | B2 * | 6/2008 | Fuente .......................... | 711/162 |
| 7,676,641 | B2 * | 3/2010 | Agombar et al. ............. | 711/162 |
| 8,219,770 | B2 * | 7/2012 | Usami ........................... | 711/162 |
| 2006/0080362 | A1 | 4/2006 | Wagner et al. | |
| 2006/0139697 | A1* | 6/2006 | Fuente .......................... | 358/296 |
| 2006/0143413 | A1* | 6/2006 | Agombar et al. ............. | 711/162 |
| 2006/0218368 | A1* | 9/2006 | Satoyama et al. ............ | 711/170 |
| 2007/0233987 | A1 | 10/2007 | Maruyama et al. | |
| 2008/0162844 | A1* | 7/2008 | Yoder et al. ................... | 711/162 |

(Continued)

OTHER PUBLICATIONS

Definition of "metadata", Free Online Dictionary of Computing (FOLDOC), retrieved from http://foldoc.org/metadata on Aug. 9, 2013 (1 page).*

(Continued)

*Primary Examiner* — Sanjiv Shah
*Assistant Examiner* — Daniel C Chappell
(74) *Attorney, Agent, or Firm* — Griffiths & Seaton PLLC

(57) ABSTRACT

For handling multiple backup processes, computer-readable program code is described for receiving one or more instructions initiating a plurality of backup processes from a single source storage volume to a plurality of target storage volumes, adding each target storage volume to a cascade of target storage volumes from the source storage volume, the target storage volumes added to the cascade in an order inversely proportional to the copy rate of the respective backup process, and starting each backup process in turn, the backup processes started in an order from the most recent target storage volume added to cascade to the first target storage volume added to cascade.

12 Claims, 6 Drawing Sheets

(56) References Cited

U.S. PATENT DOCUMENTS

| | | | |
|---|---|---|---|
| 2008/0306989 A1* | 12/2008 | Boyce et al. | 707/102 |
| 2008/0320260 A1* | 12/2008 | Watanabe | 711/162 |
| 2009/0077338 A1* | 3/2009 | Agombar et al. | 711/170 |
| 2009/0319735 A1* | 12/2009 | Agombar et al. | 711/162 |
| 2009/0327589 A1* | 12/2009 | Moshayedi | 711/103 |
| 2009/0327626 A1* | 12/2009 | Kaushik et al. | 711/162 |
| 2010/0042795 A1* | 2/2010 | Uchida | 711/162 |
| 2010/0169596 A1* | 7/2010 | Wada | 711/162 |
| 2011/0231698 A1* | 9/2011 | Zlati et al. | 714/3 |
| 2011/0283072 A1* | 11/2011 | Uratani et al. | 711/162 |
| 2012/0246424 A1* | 9/2012 | Yuhara et al. | 711/162 |

OTHER PUBLICATIONS

IBM TotalStorage Enterprise Storage Server Implementing ESS Copy Services in Open Environments, IBM, Jul. 2004, retrieved from http://www.redbooks.ibm.com/redbooks/pdfs/sg245757.pdf on Aug. 9, 2013 (642 pages).*

* cited by examiner

CASCADE ORDERING

PRIORITY CLAIM

This application claims priority to European Patent Application No. 10163131.5, filed May 18, 2010, which is hereby incorporated by reference in its entirety.

BACKGROUND OF THE INVENTION

1. Field of the Invention

This invention relates to a system for handling multiple backup processes. In one embodiment, the invention provides cascaded multiple target flashcopy consistency group start optimisation for background copy processes.

2. Description of the Related Art

The storage of data in large organisations is of fundamental importance, both for reliability of the data and for the ability to recover data in the event of any hardware failure. Storage area network (SAN) is an architecture that is used when very large amounts of data are needed to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

Various methods exist for creating data redundancy. For example, a function such as a flashcopy function enables an administrator to make point-in-time, full volume copies of data, with the copies immediately available for read or write access. The flashcopy can be used with standard backup tools that are available in the environment to create backup copies on tape. A flashcopy function creates a copy of a source volume on a target volume. This copy, as mentioned above, is called a point-in-time copy. When a flashcopy operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the flashcopy operation is initiated until the storage unit copies all data from the source volume to the target volume, or the relationship is deleted.

When the data is physically copied, a background process copies tracks from the source volume to the target volume. The amount of time that it takes to complete the background copy depends on various criteria, such as the amount of data being copied, the number of background copy processes that are running and any other activities that are presently occurring. The flashcopy function works in that the data which is being copied does not actually need to be copied instantaneously, it only needs to be copied just prior to an update causing on overwrite of any old data on the source volume. So, as data changes on the source volume, the original data is copied to the target volume before being overwritten on the source volume.

Therefore, a flashcopy is a feature supported on various storage devices that allows a user or an automated process to make nearly instantaneous copies of entire logical volumes of data. A copy of a source disk is made on a target disk. The copies are immediately available for both read and write access. A common feature of flashcopy like implementations is the ability to reverse the copy. That is, to populate the source disk of a flashcopy map with the contents of the target disk. It is also possible to use flashcopy in cascaded implementations, in which a target disk later becomes the source disk for a further flashcopy or vice versa.

A cascaded configuration of storage volumes is described in detail in U.S. Pat. No. 7,386,695. It is also possible to create multiple cascades of storage volumes which are interlocking at a logical level. A first cascade may comprise storage volumes A, B, C and D which are arranged in a cascade as follows: A↔B↔C↔D, while at a later time a new backup of A may be started that ultimately leads to the creation of A↔E↔F. Many different combinations of flashcopy functions and reversed functions are possible, potentially creating complicated multiple cascading storage volumes.

A typical use case for multiple target flashcopy is to create a number of application consistent snapshots of a production disk (the source volume of the flashcopies). This is done using some form of a consistency group in order to guarantee that all the copies are identical. Both the cascaded and the "classical" implementations of multiple target flashcopy do not minimise the read access redirected to the production disk effectively as part of the background copy process used to create the independent copies.

One solution to this problem, which is appropriate to both the classical and cascaded approaches to multiple flashcopy implementations would be to perform a single read of the source disk and multiple writes to each of the targets. However such a solution is not scalable with the number of targets created. This solution also makes it difficult to have different background copy rates for different flashcopy maps. Another solution appropriate to the cascaded approach is to ensure that the last started map completes its background copy process before the background process of the next last started map begins. The problem with this solution is that the length of time taken to produce an independent copy increases with the number of copies required.

It is therefore an object of the invention to improve upon the known art.

SUMMARY OF THE INVENTION

According to a first aspect of the present invention, there is provided a method of handling multiple backup processes comprising receiving one or more instructions initiating a plurality of backup processes from a single source storage volume to a plurality of target storage volumes, adding each target storage volume to a cascade of target storage volumes from the source storage volume, the target storage volumes added to the cascade in an order inversely proportional to the copy rate of the respective backup process, and starting each backup process in turn, the backup processes started in an order from the most recent target storage volume added to cascade to the first target storage volume added to cascade.

According to a second aspect of the present invention, there is provided a system for handling multiple backup processes comprising a plurality of storage volumes and a storage volume controller connected to the storage volumes, the storage controller arranged to receive one or more instructions initiating a plurality of backup processes from a single source storage volume to a plurality of target storage volumes, add each target storage volume to a cascade of target storage volumes from the source storage volume, the target storage volumes added to the cascade in an order inversely proportional to the copy rate of the respective backup process, and start each backup process in turn, the backup processes started in an order from the most recent target storage volume added to cascade to the first target storage volume added to cascade.

According to a third aspect of the present invention, there is provided a computer program product on a computer readable medium for handling multiple backup processes, the product comprising instructions for receiving one or more instructions initiating a plurality of backup processes from a single source storage volume to a plurality of target storage volumes, adding each target storage volume to a cascade of target storage volumes from the source storage volume, the target storage volumes added to the cascade in an order inversely proportional to the copy rate of the respective backup process, and starting each backup process in turn, the backup processes started in an order from the most recent target storage volume added to cascade to the first target storage volume added to cascade.

Owing to the invention, it is possible to provide system that will schedule a cascade of backup processes (such as flashcopy) that will minimise the number of reads that are required of the host disk (the source storage volume), but without slowing down any of the actual backup processes. The solution improves the cascaded implementation of multiple target flashcopy by ordering the adding to the cascade of the flashcopy maps for a single source in a consistency group inversely with respect to the background copy rate of the map and suppressing the start of a flashcopy map's background copy process until the background copy process of each map added to the cascade later has been started.

The advantage of this approach is that each map can have its own background copy rate, each map does not need to wait for "younger" maps to complete the background copy process and the solution is scalable with respect to the number of copies made. The total number of read and write operations required to complete the background processes for all maps is unchanged, but the number of read operations directed to the production disk is reduced.

For example, with a production disk A it is possible to make copies B, C, D and E of this disk using flashcopy, by creating flashcopy maps A→B, A→C, A→D and A→E in a single consistency group with background copy rates w, x, y, z respectively. If the copy rates of the maps are such that w≥x≥y≥z, then when the consistency group is started, the map A→E is added to the cascade first, because this has the lowest background copy rate, z and so on. This results in cascade A→B→C→D→E. When all maps are in the cascade, the background copy process of A→B is started first, followed by the backup process for A→C and so on. This means that the backup process A→B copies a grain of data from volume A to volume B first. Then backup process A→C will copy the data from B→C and so on. So it can be seen that only one read of the source storage volume (the production disk A) is required for all four copies to be completed, because the background copy rates of "younger" maps are greater than "older" ones.

BRIEF DESCRIPTION OF THE DRAWINGS

Embodiments of the present invention will now be described, by way of example only, with reference to the accompanying drawings, in which.

DETAILED DESCRIPTION OF THE DRAWINGS

Figure 1:
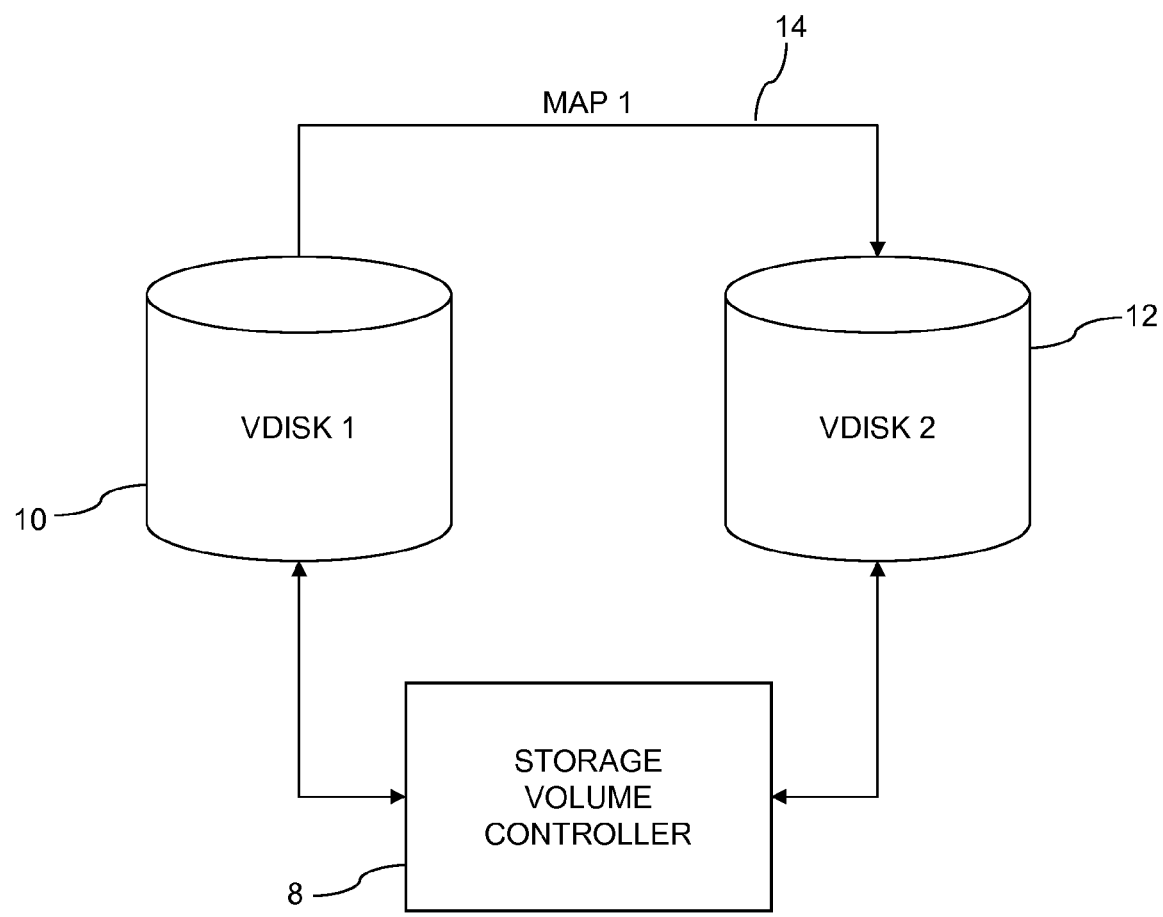
FIG. 1 is a schematic diagram of a pair of storage volumes.

FIG. 1 illustrates the concept of a flashcopy using a storage controller 8 and two storage disks 10 and 12. The disks 10 and 12 could form part of a larger array of disks, and would typically form part of an enterprise storage solution. The disks 10 and 12 could be part of a storage solution relating to a commercial website, for example. If at any time a backup needs to be made of the content of vdisk1, then a flashcopy instruction can be sent from the storage volume controller 8 to that disk 10, which defines a source disk 10 (vdisk1) and also a target disk 12 (vdisk2), which is the target of the flashcopy. The flashcopy instruction creates a point-in-time copy of the image of the specific vdisk which is the source disk 10.

In the example of FIG. 1, the source disk 10 of a first flashcopy instruction is vdisk1, and the target disk 12 is vdisk2. The flashcopy instruction starts the flashcopy process, which creates a map 14 from the source disk 10 to the target disk 12. This map is labelled map 1 in the Figure. The image of vdisk1 at this specific point in time is now available on vdisk2. This creates a backup of the data on vdisk1, and also allows tests and other administration tasks to be run on the data of vdisk1, without the attendant danger of losing any of the original data, as it is preserved on the original source disk.

When a flashcopy is made, it creates a link between the two disks 10 and 12, as defined by the map 14. Data may now be copied across in the background, with the additional requirement that any access to vdisk2 (as the target disk 12) will immediately cause the relevant parts of the image of vdisk1 to be copied across, and also any access to vdisk1 which would result in a change to the image stored by that disk 10 will also cause the unaltered data to be immediately copied across to the target disk 12, prior to the change being made. In this way, the vdisk2, to an outside user, stores the point in time copy of vdisk1, although data will only be physically copied across under the circumstances described above.

Figure 2:
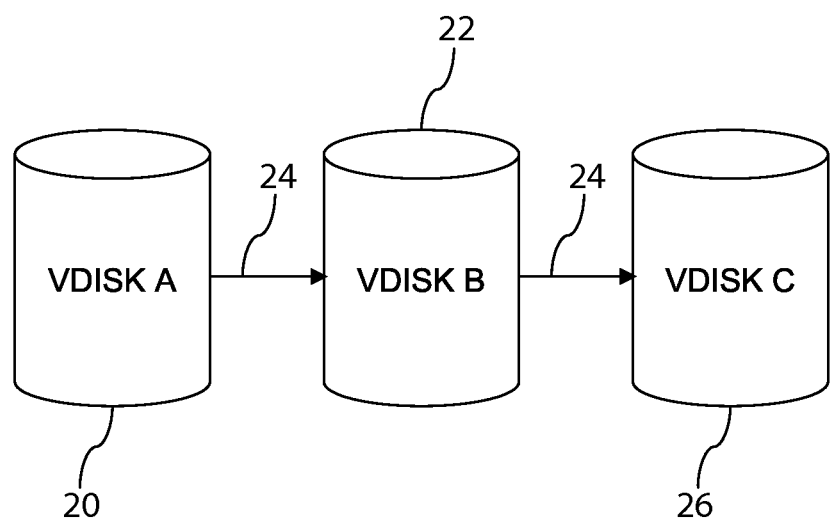
FIG. 2 is a schematic diagram of a flashcopy cascade.

A storage volume that is the target volume of a flashcopy function can also be the source volume of a further flashcopy function, thus creating a cascade of storage volumes. In FIG. 2 there is shown an example of a flashcopy cascade of three storage volumes 20, 22, and 26, which are linked by respective flashcopy maps 24. Each map 24 defines a flashcopy function from a source volume to a target volume. Disk B is providing a backup of disk A, and disk C is providing a backup of disk A, through disk B. The flashcopy functions 24 linking the different storage volumes may have been started at different times, which create different point-in-time copies of the images stored by the respective storage volumes, or could have been started simultaneously.

In the flashcopy cascade of A→B→C, where A, B and C are the disks in the cascade, as shown in FIG. 2, and the arrows are the flashcopy maps, then denoting (A, B) to be a flashcopy mapping from disk A to disk B, the cascade has maps (A, B) and (B, C). In this implementation of the cascade, any new data write to disk A will cause a write to disk B, as per the respective flashcopy function, which is required to maintain the image on disk B. This writing to disk B this will cause a further clean read of disk B followed by a write to disk C. In this way a single write to the first storage volume 20 in the cascade can result in a number of operations throughout the cascade.

When a cascade is created, the new maps and new storage volumes are inserted into the cascade, not added to the end of the cascade. In the cascade shown in FIG. 2, the first backup process started would be A→C. When the backup process A→B is then started, the new target storage volume B is effectively "inserted" between the existing source storage volume A and the existing target storage volume C. This "insertion" is purely a logical construction illustrating the fact that target disk C will receive data writes from disk B, rather than disk A. This is how a cascaded implementation differs from a conventional arrangement which would have two independent maps from disk A.

When a cascade is formed by the simultaneous taking of multiple backups from the disk A, then an ordering of the cascade is created using the different copy rates of the background backup processes that have been started. For example, a user may simultaneously request that three different copies be made of a production disk A. The different copies may be taken for different purposes. A first backup may be a true backup of the data on disk A in order to guard against any failure of disk A. A second backup may be taken to be used to test certain processes on the data, without the danger of losing any of the original data, while a third backup may be taken for the purpose of reading the data to tape, to create a permanent record.

The different backup processes can therefore have different copy rates associated with them, which can be user defined, or more likely will be initially set by administrator at a system level and used automatically according to the purpose of the backup process being taken. For example, the backup process initiated to perform testing on the stored data will have a higher copy rate assigned, as the backup of the data on disk A, for this purpose, needs to be completed as quickly as possible, in order to allow the testing to start as soon as possible. Contrastingly, the backup process simply to make a copy of the data on a different disk as a true backup of the data may have a lower copy rate assigned.

Figure 3:
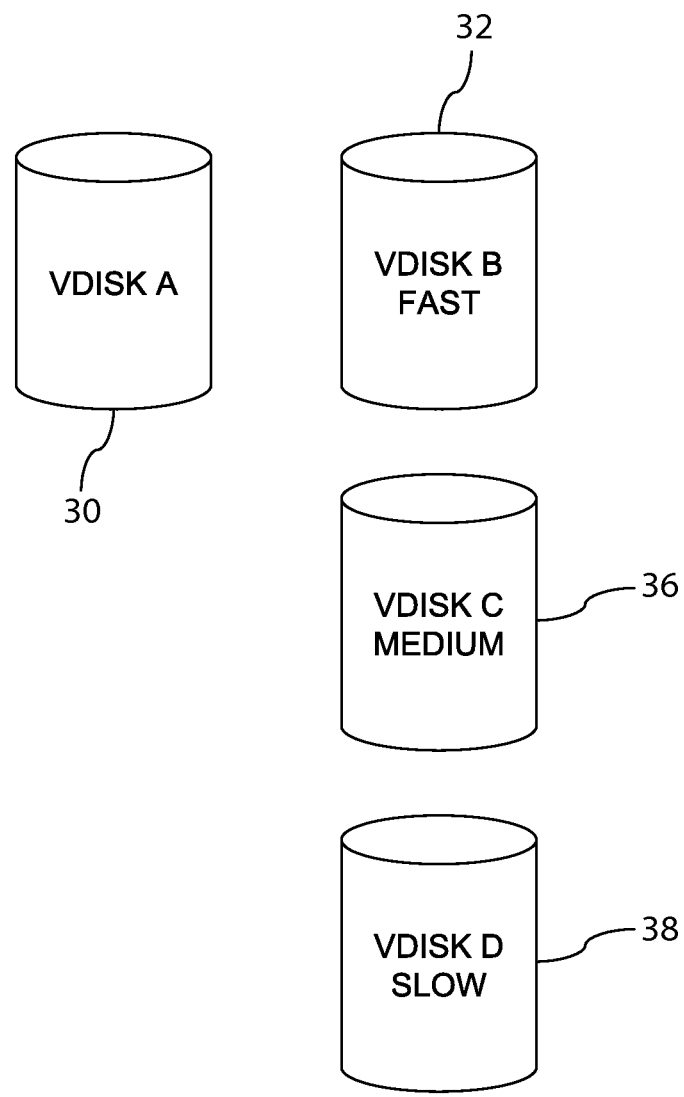
FIG. 3 is a schematic diagram of a plurality of storage volumes.

FIG. 3 illustrates a plurality of storage volumes 30 to 38 to be used to create a flashcopy cascade that is to be ordered with respect to three different backup processes, which can be characterised by different copy rates "fast", "slow" and "medium". These copy rates are relative terms and define the rate at which data is copied from the source storage volume A (the actual production disk) to the individual target storage volumes. Although the copy rates are shown as labelling the specific storage volumes, it should be understood that the copy rates relate to the backup process that is copying the data to the specific storage volume, not the actual storage volume itself In hardware terms, the target storage volumes are identical.

Figure 4:
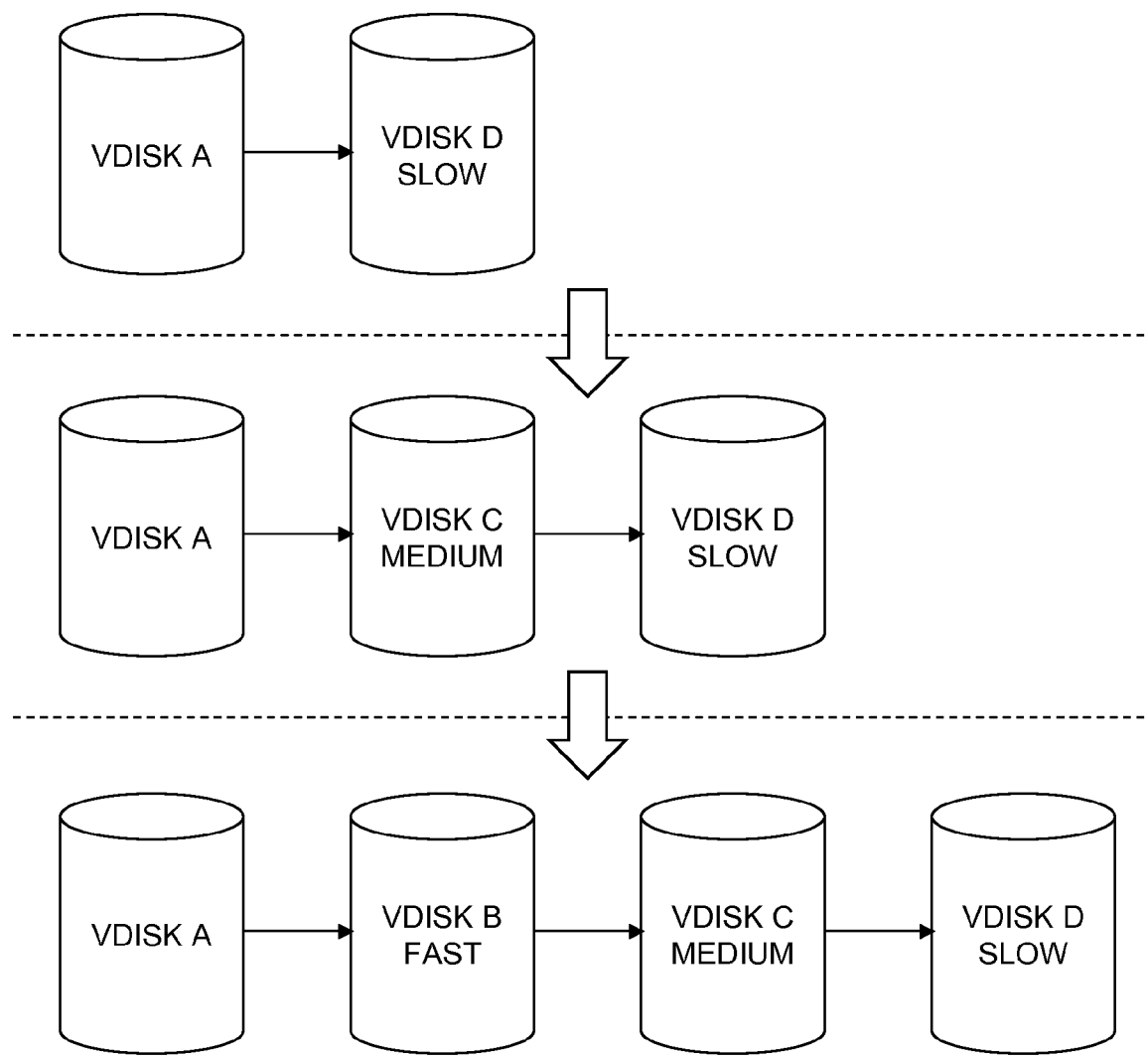
FIG. 4 is a schematic diagram of the construction of a cascade from the storage volumes of FIG. 3.

The process of creating the cascade from the storage volumes of FIG. 3 is shown in FIG. 4. Each target storage volume is added in turn to the cascade of target storage volumes that cascades from the source storage volume, in such a way that the target storage volumes are added to the cascade in an order that is inversely proportional to the copy rate of the respective backup process. It can be seen in FIG. 4, that the first action taken is the adding of target storage volume D is first added to the cascade, as this storage volume has the slowest copy rate of the backup process that is associated with that specific storage volume.

The second action is the addition of the target storage volume C, which has "medium" copy rate for the backup process that is associated with that specific storage volume C. The cascade now contains three storage volumes, the original production disk A (which is the source storage volume) and the two target storage volumes C and D. Note that the nature of the cascade addition rule is that the last added storage volume is placed closest to the source storage volume A, so that the addition of the target storage volume C means that this disk is inserted between volumes A and D, in the logical arrangement of the storage volumes.

Finally, the third target storage volume, disk B, is added to the cascade. This storage volume has the fastest copy rate for the backup process that is associated with the specific disk B, so this target storage volume is added to the cascade last, as the volumes are added in an order that is inversely proportional to their associated copy rate. As per the algorithm for adding disks to a cascade, the last added storage volume, disk B, is placed closest to the source storage volume A. The storage volume B is therefore inserted between the production disk A and the target storage volume C. This action completes the cascade.

Figure 5:
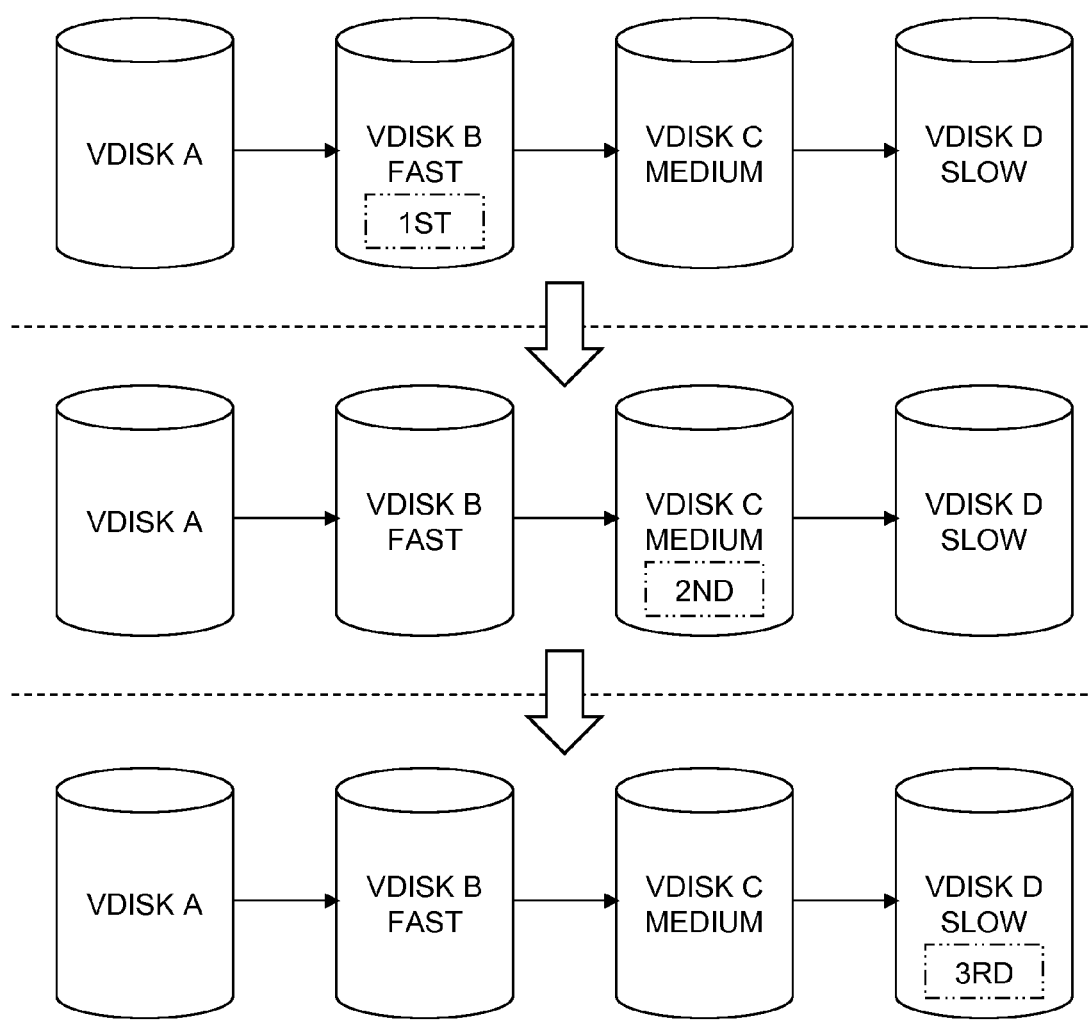
FIG. 5 is a schematic diagram of the ordering of the starting of backup processes.

Once the cascade has been created, then the backup processes that define the maps between the storage volumes need to be started. The storage volume controller 8 will start each backup process in turn, the backup processes being started in an order from the most recent target storage volume added to cascade to the first target storage volume added to cascade. As can be seen in FIG. 5, this means that the backup process that is started first is the process that is associated with the target storage volume B, as this was the last storage volume to be added to the cascade. As can be seen in the Figure, this backup process is started first.

The remaining backup processes from the production disk A, which form the cascade, are then started in turn. After the backup process for storage volume B has been started then the backup process for volume C is started, followed by the start of the backup process for volume D. In this way, the backup processes are started one after another until all have been started. The order in which the processes are started is the opposite of the order by which the different storage volumes were added to the cascade. Faster backup processes are started before slower backup processes. Once the cascade has been ordered and the backup processes started, then the flashcopy cascade will run as normal.

The methodology described above for the addition of the volumes to the cascade and the starting of the backup processes must also be able to deal with the situation when two (or more) backup processes that are scheduled to start together actually have the same copy rate. This can easily happen if, for example, a user wishes to perform two different testing scenarios on the dataset of production disk A and will correspondingly schedule two backup processes from disk A to respective target storage volumes. The storage volume controller 8 can make an arbitrary decision on which to add to the cascade first, as this is immaterial to the overall performance, but must still start the backup processes in the inverse order to which the volumes were added to the cascade.

Figure 6:
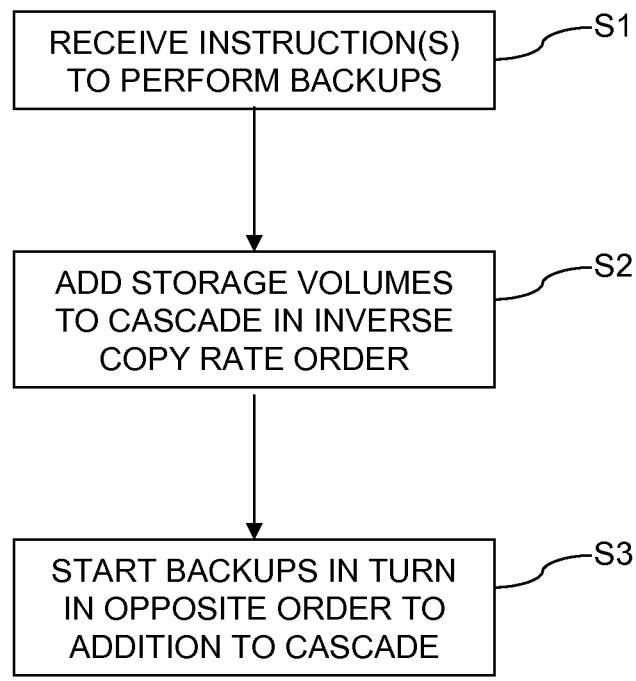
FIG. 6 is a flowchart of a method of handling the backup processes.

FIG. 6 is a flowchart summarizing the operation of the storage volume controller 8 in performing the flashcopy scheduling function. The first step Si comprises receiving one or more instructions initiating a plurality of backup processes from a single source storage volume to a plurality of target storage volumes. All of the backup processes may be triggered by a single instruction from a user, or multiple instructions may be sent by the user to initiate the taking of the backups from the production disk. Essentially multiple copies are to be taken from the same source storage volume with multiple independent backup processes. The storage volume controller 8 is responsible for the scheduling of these tasks.

The second step S2 performed by the storage volume controller 8 comprises the step of adding each target storage volume to a cascade of target storage volumes from the source storage volume, the target storage volumes being added to the cascade in an order that is inversely proportional to the copy rate of the respective backup process. This step is described above in detail with reference to the example of FIG. 4. Essentially the target storage volumes are added in order to the cascade, with the volume associated with the slowest copy rate being added to the cascade. After each individual addition, then the next volume associated with the next slowest copy rate is added to the cascade.

The final step of the method is step S3 in which each backup process is started in turn, the backup processes being started in an order from the most recent target storage volume added to cascade to the first target storage volume added to cascade. In a preferred embodiment, this step of starting each backup process in turn comprises suppressing the start of each backup process until all of the backup processes for target storage volumes added later to the cascade have been started. This step is described above in detail with reference to the example of FIG. 5. The backup processes are each started in turn, in the opposite order to which the corresponding storage volumes were added to the cascade.

The scheduling of the cascade of backup processes described above minimizes the number of reads that are required of the production disk, but without slowing down any of the actual backup processes. This solution provides an improvement in the cascaded implementation of multiple target flashcopy. This is achieved by ordering the adding to the cascade of the flashcopy maps for a single source in a consistency group inversely with respect to the background copy rate of the map and suppressing the start of a flashcopy map's background copy process until the background copy process of each map added to the cascade later has been started. The main advantage of this approach is that each background process will have its own background copy rate and does not need to wait for other background copy processes to complete. The total number of read and write operations required to complete the background processes for all backup processes is unchanged, but the number of read operations directed to the production disk is reduced.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for handling multiple backup processes comprising:
    a plurality of storage volumes; and
    a storage volume controller connected to the plurality of storage volumes, the storage controller configured to receive one or more instructions initiating a plurality of backup processes from a source storage volume to a plurality of target storage volumes, add each target storage volume to a cascade of target storage volumes from the source storage volume, the target storage volumes added to the cascade of target storage volumes in an order inversely proportional to the copy rate of the respective backup process such that a first target storage volume added to the cascade of target storage volumes has a slowest copy rate, a next added target storage volume to the cascade of target storage volumes has a faster copy rate than an immediately prior added target storage volume, and a most recent target storage volume added to the cascade of target storage volumes has a fastest copy rate, and
    start each backup process in turn, the backup processes started in an order from the most recent target storage volume added to the cascade of target storage volumes to the first target storage volume added to the cascade of target storage volumes.

2. A system according to claim 1, wherein each backup process comprises a flashcopy function creating a point-in-time copy of a first source storage volume on a corresponding target storage volume.

3. A system according to claim 2, wherein the storage controller is configured, when starting each backup process in turn, to suppress a start of each backup process until all backup processes for target storage volumes subsequently added to the cascade of target storage volumes have been started.

4. A system according to claim 1, wherein the storage controller is configured, when starting each backup process in turn, to suppress a start of each backup process until all backup processes for target storage volumes subsequently added to the cascade of target storage volumes have been started.

5. A system according to claim 4, wherein the storage controller is further configured to detect that two or more backup processes have a same copy rate and, when adding each target storage volume to the cascade of target storage volumes, to make an arbitrary decision on which of the target storage volumes with backup processes having the same copy rate should be added to the cascade of target storage volumes first.

6. A system according to claim 1, wherein the storage controller is further configured to detect that two or more backup processes have a same copy rate and, when adding each target storage volume to the cascade of target storage volumes, to make an arbitrary decision on which of the target storage volumes with backup processes having the same copy rate should be added to the cascade of target storage volumes first.

7. A computer program product on a non-transitory machine-readable storage medium for handling multiple backup processes, the product comprising:
    computer code for receiving one or more instructions initiating a plurality of backup processes from a single source storage volume to a plurality of target storage volumes,
    computer code for adding each target storage volume to a cascade of target storage volumes from the source storage volume, the target storage volumes added to the cascade of target storage volumes in an order inversely proportional to the copy rate of the respective backup process such that a first target storage volume added to the cascade of target storage volumes has a slowest copy rate, a next added target storage volume to the cascade of target storage volumes has a faster copy rate than an immediately prior added target storage volume, and a most recent target storage volume added to the cascade of target storage volumes has a fastest copy rate, and
    computer code for starting each backup process in turn, the backup processes started in an order from the most recent target storage volume added to the cascade of target storage volumes to the first target storage volume added to the cascade of target storage volumes.

8. A computer program product according to claim 7, wherein each backup process comprises a flashcopy function creating a point-in-time copy of a source storage volume on a target storage volume.

9. A computer program product according to claim 8, wherein the computer code for starting each backup process in turn comprise computer code for suppressing the start of each backup process until all of the backup processes for target storage volumes added later to the cascade of target storage volumes have been started.

10. A computer program product according to claim 9, and further comprising computer code for detecting that two or more backup processes have a same copy rate and, when adding each target storage volume to the cascade of target storage volumes, for making an arbitrary decision on which of the target storage volumes with backup processes having the same copy rate should be added to the cascade of target storage volumes first.

11. A computer program product according to claim 7, wherein the computer code for starting each backup process in turn comprise computer code for suppressing the start of each backup process until all of the backup processes for target storage volumes added later to the cascade of target storage volumes have been started.

12. A computer program product according to claim 7, and further comprising computer code for detecting that two or more backup processes have a same copy rate and, when adding each target storage volume to the cascade of target storage volumes, for making an arbitrary decision on which of the target storage volumes with backup processes having the same copy rate should be added to the cascade of target storage volumes first.

\* \* \* \* \*